United States Patent [19]
Quaggio

[11] Patent Number: 5,747,960
[45] Date of Patent: May 5, 1998

[54] COMPUTER CONTROLLED GEARSHIFT WITH AUTOMATIC CLUTCH ACTUATOR FOR VEHICLES WITH MANUAL GEARBOXES

[75] Inventor: Saulo Quaggio, Sao Paulo, Brazil

[73] Assignee: Saulo Quaggio, Sao Paulo, Brazil

[21] Appl. No.: 583,068

[22] PCT Filed: Jul. 5, 1994

[86] PCT No.: PCT/BR94/00021

§ 371 Date: Jul. 22, 1996

§ 102(e) Date: Jul. 22, 1996

[87] PCT Pub. No.: WO95/02857

PCT Pub. Date: Jan. 26, 1995

[30] Foreign Application Priority Data

Jul. 8, 1993 [BR] Brazil ............................... 9302458

[51] Int. Cl.$^6$ ............................... B60K 20/00; G05G 9/00
[52] U.S. Cl. .................... 318/625; 318/626; 74/336 R; 74/473 R
[58] Field of Search ............................... 318/625, 626; 74/335, 336 R, 337, 473 R; 364/424.08, 424.093, 424.096

[56] References Cited

U.S. PATENT DOCUMENTS

| 5,067,362 | 11/1991 | Holdenried | 74/335 |
| 5,089,962 | 2/1992 | Steeby | 364/424.1 |
| 5,089,965 | 2/1992 | Braun | 364/424.1 |

*Primary Examiner*—Bentsu Ro
*Attorney, Agent, or Firm*—Friedman Siegelbaum LLP

[57] ABSTRACT

A controlled method to automate a power train transmission of a vehicle with a manual gearbox considering all moments of inertia in clutch actuations through dual servomotors, executing controlled up and down gearshifts automatically. The control system encompasses a central microprocessor controller unit that executes functions based on special equations that reflects instantaneous moments of inertia wherein gearshifts are decided based upon the vehicle's instantaneous speed and the increase or decrease of motor RPM, whether it is gas pedal sensed or road inclination derived. A fuel flow control is activated in each gearshift to insure RPM control within the next gear engaging range.

11 Claims, 2 Drawing Sheets

COMPUTER CONTROLLED GEARSHIFT WITH AUTOMATIC CLUTCH ACTUATOR FOR VEHICLES WITH MANUAL GEARBOXES

FIELD OF THE INVENTION

The invention relates to a motor vehicle power train control device which means motor, clutch and gearbox managing through several sensors, actuators and servo mechanisms while providing an intelligent substitute to automatic hydraulic gearboxes, without power consuming torque converters and additional braking devices thus allowing better motor and clutch management.

BACKGROUND OF THE INVENTION

The use of automatic gearbox based on hydraulic pump and torque converter characteristics has been well known for decades and used on all kinds of vehicles to automate the gearshift and clutch actuation, including the gas pedal movement (position) and gearbox load conditions, the only parameters gathered to decide a gearshift action. The disadvantages of this type of hydraulic automatic transmission has (a) also been well known including the lowering of transmission efficiency (increased power loss when compared to a manual gearshift) to perform vehicle departure from stop condition while transferring torque to the wheels and gearshift operations while moving on the road, (b) the number of gearshifts performed that is normally limited to 5 gears ahead and one rear gear, (c) the need to have it factory-installed due to the required more powerful motor, (d) the increased acquisition and operational costs if compared to a manual gearshift-motor couple and (e) the further need to have additional braking devices to help assure stopping of the vehicle as well.

Also known are the past use of gearshift devices, some electric, some hydraulic (British Leyland buses of the 60s and Chrysler vehicles of the 70s and more recently F-1 racing cars button actuated up-down gearshift. Additionally there are electronically controlled hydraulic clutch actuators made by Luk GmbH and Sachs GmbH, both German manufacturers. Further known are heavy vehicle electronic driven gearboxes made by Eaton—an American manufacturer, ZF—a German manufacturer and Volvo—a Swedish manufacturer, which use electronic gearshift engaging synchronizers and servo mechanism actuators to perform speedier gearshifts as compared to those made through mechanical synchronizing rings.

There are also some electronic controllers for the original hydraulic automatic transmission in order to tighten the gearshift point tolerance to permit different behavior in gearshift point to simulated heavy traffic or a clear road condition (calm or sporty response).

It is an object of this invention to provide low power, fully automated power train setup, wherein instantaneous different power transmissions behavior can be achieved while providing the feeling of an automatic transmission driver and also by permitting, through software control, a driver conducted manual gearshift when and where necessary.

SUMMARY OF THE INVENTION

The method and apparatus of a Computer Controlled Gearshift with Automatic Clutch Actuator for Vehicles with Manual Gearboxes comprises servo mechanisms, electric sensors, magnetic sensors, resistive potentiometer sensors and electric actuators connected to and controlled by a central microprocessor controller unit that performs a special set of instructions to automate all gearshift and clutch actuations in a manual gearbox equipped vehicle in such a way as to enable it to perform like an automatic transmission vehicle, without imposing any alterations to the vehicle manufacturer's motor-wheel transmission specifications.

Several types of clutch actuators and gearshifts devices are known, but none of them appear to encompass the behaviors here presented, specially the novel clutch dual servomotors concept which really senses moments of inertia related to all loads presented in a motor driven vehicle. Also the novel gearshifts electric servomotors with positioning feedback concept are best suited to assure fast gear engagement with or without synchronizing rings gears speed matching gearboxes. Furthermore, by allowing sensing of the moments of inertia, different power train behaviors can be continuously achieved in order to obtain the best match for that vehicle's instantaneous speed, motor RPM, gear engaged and road inclination—i.e., horizontal, uphill or downhill.

The present invention permits the association of the low power transmission losses of a manual gearbox with a computer controlled precision gearshift timing decision, an action that very few vehicle drivers and some original hydraulic automatic gearboxes fail to perform correctly (plus or minus 10% tolerance), thereby allowing a better (higher) mileage per gallon (kilometer per liter of fuel) if compared to the original hydraulic automatic gearbox, an improvement in the power transmission component's life if compared to the manual gearbox, plus the safety and comfort of an automatic transmission vehicle, without the use of an additional braking device. Moreover, the present system can be installed in a working vehicle, with any quantity of ahead and rear gears at a fraction of the cost of factory-installed automatic gearbox components with the added ability to take into account vehicle changing load behavior.

The present invention, behaves like a driver's actions, moving the gearshift lever and the clutch accordingly and controlling the fuel flow as well. The central microprocessor controller unit decides when a gearshift should take place and how (up or down), how and when the clutch is to be actuated and further controlling the fuel flow in order to adjust the engine (motor) speed (R.P.M.—rotations per minute) to permit better engaging of the gearshift as the gearshift lever and the clutch pedal are eliminated as both functions are to be actuated by the central microprocessor controller unit through servo mechanisms and are no longer available to the vehicle (human) driver.

BRIEF DESCRIPTION OF THE DRAWINGS AND DETAILED DESCRIPTION OF THE PREFERRED EMBARKMENT

For a better understanding of the present invention operation and its components the following drawings are used for demonstration of the preferred embodiment, but should not be considered as a restriction to the invention's function or usefulness:

FIG. 1 shows an example of a 5 gear ahead, one rear gear and 3 neutral position gearshift lever template. In this example, there are two servo mechanisms, composed of a selection servo motor with a transversal movement (moves the gearshift lever towards one of the 3 neutral positions) and an engaging servo motor with a longitudinal movement (moves the gearshift lever towards one of the 6 possible gearshift engaging positions);

Figure 3:
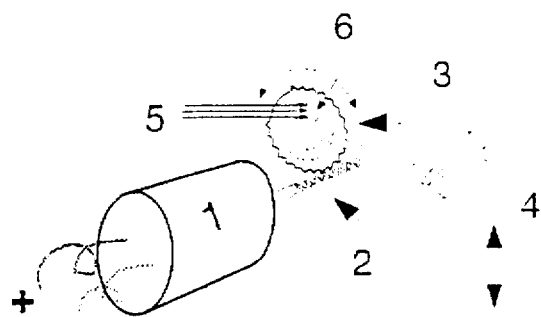
FIG. 3 shows an example of the binary coded electric disc sensor (6) installation on a servo motor gear face plate (3) driven by a worm gear (2) that is an extension of the direct current motor axle (1); also a view of a lever attached to the face plate gear (3) axle is provided with an arm (4) to enable a rotation movement to be converted to a translation movement.
Figure 4:
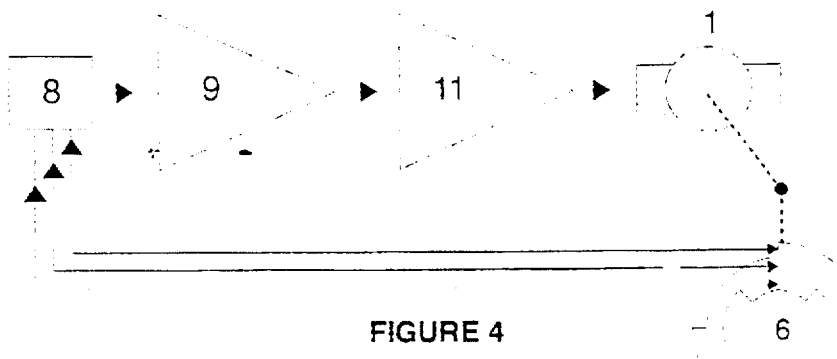
Figure 5:
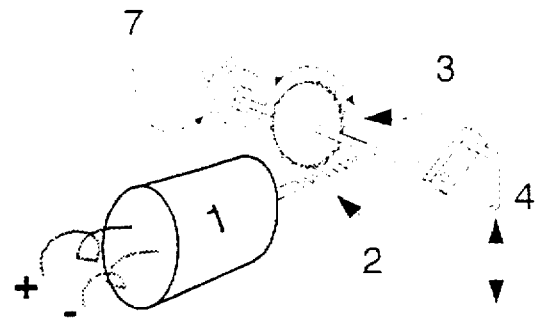
Figure 6:
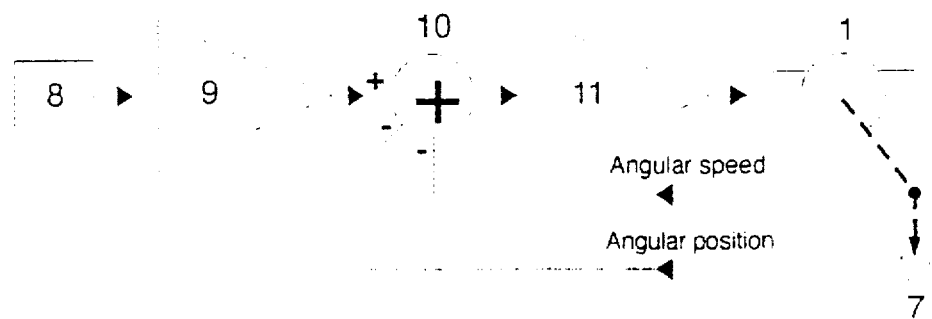
Figure 7:
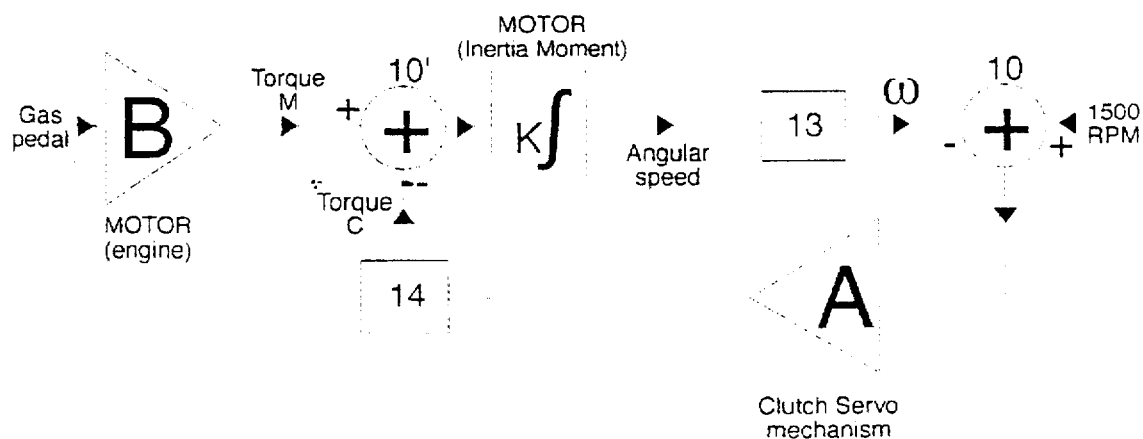

FIG. 4 shows one of the gearshift lever movements servo mechanisms block diagram, where the central microprocessor controller unit (8) when detecting the right timing for a gearshift action drives a digital-to-analog converter (9) that feeds a power amplifier (11) that drives the direct current motor (1), that when turning its axle, changes the binary coded electric disc sensor (6) position, and therefore the binary coded signal it supplies through the electric contacts (5) are fed back to the central microprocessor controller unit (8);

FIG. 5 shows an example of a view of the clutch servo mechanism, where the resistive potentiometer sensor installation (7) at the face plate gear axle (3) driven by the worm gear (2) that is an extension of the direct current motor axle (1) can be identified and the remaining components as explained in FIG. 3;

FIG. 6 shows an example of the clutch actuator servo mechanism block diagram, where the central microprocessor controller unit (8) position feedback as detailed in FIG. 7 feeds a digital-to-analog converter (9), which output is connected to a non-inverting input of a summing circuit (10) that has also connected to its other two inverted inputs feedback signals picked up one from the resistive potentiometer (7) axle position and the other one proportional to the angular speed of the axle rotation movement, then the summing result is fed to the power amplifier (11) that drives the direct current motor (1) to rotate in one or other sense of rotation in fast or slow motion;

FIG. 7 shows the complete clutch actuator servo mechanism block diagram at the vehicle's very departure moment from stop condition where the full block diagram described in FIG. 6 (labeled here solely as block A), and the remaining components are the gas pedal that controls the engine (motor) labeled block B that, by its turn, supplies a torque M (M as Motor) to a non-inverting input of a mechanical summing device (10') that, when idle, represents the motor axle rotation speed (RPM), which, by its turn, is further delayed by the motor inertia moment and when the axle rotation reaches for instance, 1500 RPM, the electronic summing circuit (10) drives the clutch (14) to engage the gearbox where a torque C (C representing clutch) is produced and a feedback is provided to the inverting input of the mechanical summing device (10'), thus reducing the motor axle speed (RPM) and its action can be understood as a brake effect on it, but the motor is further affected by its own inertia moment, thereby a new motor axle angular speed ω is then set and measured by a RPM sensor (13) and, depending upon its value, compared to the threshold example of 1500 RPM at the electronic summing circuit (10). A signal (positive or negative) is then fed to the clutch actuator servo motor A, thus increasing or decreasing the clutch engaging pressure by changing its rotational direction.

On the basis of the previous drawings and the corresponding descriptions, a detailed explanation of the invention operation and details are now presented, starting with the central microprocessor controller unit 8, which is a classic circuit comprising a microprocessor, random access memories, read only memories, I/O circuits, timers and interrupt controls, plus digital-to-analog and analog-to-digital circuits 9, summing circuits 10 and power amplifiers 11.

Figure 1:
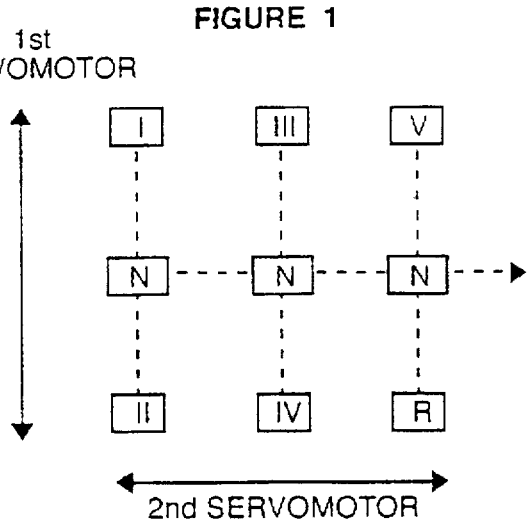

The gearshift servo mechanism as described in the example of FIG. 1 with 5 gears ahead and one rear gear, shown generically and not restrictive only to demonstrate some of the invention concepts, shows two servo motors, each one with three stable positions that are set by the central microprocessor controller unit. In this example, they work coordinately to establish 9 possible gearshift lever positions, not restricting yet a third servo motor to engage/disengage an additional reduced gear as to double the gear's figure.

Figure 2:
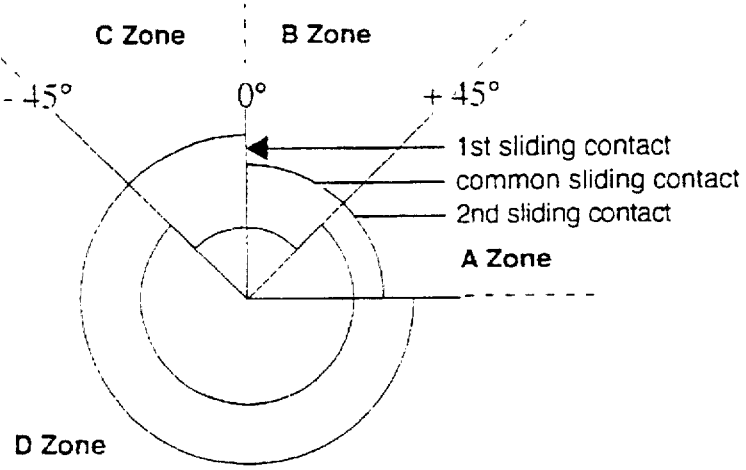
FIG. 2 shows an example of a binary coded electric disc sensor (6) installed at the gearbox lever actuator servo motor axle, wherein the sliding electric contacts transfer the coded information of the axle position.

Attached to each servo motor power axle is a position sensor (6) and, in the example given, the position sensor is a binary coded electric disc sensor with 3 sliding contacts that divide the axle angular movement in 4 different binary coded areas. The axle stable (stop) positions in the given example are the 3 boundaries of the 4 different binary coded areas. These positions are located at, e.g., +45°, 0° and −45° as shown in FIG. 2. Each one of these 4 areas presents a unique binary coded signal to the central microprocessor controller unit 8, thereby allowing it to identify in which area the servo motor axle is at any moment, thus enabling the central microprocessor controller unit 9 to send the right polarity current to move the axle in the correct direction and to further stop it in one of the 3 possible boundaries as shown in FIG. 3

The servo mechanism stabilization can be understood by examining FIG. 4. Suppose that the motor axle stands in the boundary located between the first and the second disc sensor (6) zones and a decision is made to move it to the boundary located between the second and the third disc zones. The central microprocessor controller unit 8 applies full power to the servo motor to rotate it in the direction of the third area until the boundary is crossed. Then the central microprocessor controller unit 8 reverses the electric current, with reduced power to stop axle rotation and to return it again to the crossed boundary that, when detected, the drive current is shutoff. This process insures sufficient mechanical precision and the fastest possible settling time and are the basic characteristics of an ON-OFF servo mechanism. The gearshift servo motors are never actuated simultaneously. Example: the gearbox is operating in the second gear and the central microprocessor controller unit is going to make a gearshift to the third gear. Therefore, the first servo motor is actuated to move the lever to the next neutral position, then the second servo motor is actuated to move the lever to the neutral position corresponding to the third gear, again the first servo motor is actuated to engage the third gear.

The clutch servo mechanism can be examined in FIG. 5 and one notes that this is a more elaborate servo mechanism, thereby allowing it to stop its axle in any point of its angular course. See also FIG. 6 block diagram. Attached (ganged) to the servo motor axle is a variable resistive potentiometer (7) that feeds back to the central microprocessor controller unit 8 a signal (DC voltage) proportional to instantaneous angle exhibited by the servo motor axle. This signal is compared to the desired wheels torque value, allowing the central microprocessor controller unit 8 to invert it and/or reduce its driving current until the final value is reached when a current shut-off occurs.

For increased stability, a signal value which is proportional to the axle angular speed is also fed back to the servo mechanism circuits. The central microprocessor controller unit 8 controls the clutch servo motor axle final positioning through a digital-to-analog converter 9 that is power amplified to drive the servo motor. All power amplifiers 11 are pulse width modulated to reduced power dissipation. Regarding other sensors, the present invention has one position sensor (variable resistive potentiometer) 7 attached to the gas pedal to supply an analog signal that reflects the pressure applied to it, and two speed sensors, one attached to the gearbox speedometer cable connector that reflects vehicle speed and the second to the motor in order to reflect rotation-per-minute figures, both pulse output devices. In the given example, the position sensor (variable resistive potentiometer) attached to the gas pedal furnishes an analog signal to the analog-to-digital converter 9 located at the central microprocessor controller unit 8 that reflects the driver intention to accelerate, reduce or to keep the present speed as it also reflects the supplied fuel to the motor.

The speed sensors actually measure wheel and motor rotation periods. The angular speed is derived from its inverse by the central microprocessor controller unit computing algorithm as speed =1/period. In order to compute the motor rotation period, two pulses' time interval from, e.g. the spark plug pulses are doubled in a 4 stroke, 4 cylinder gasoline motor as there are only two explosions per motor axle turn and, in a diesel motor, a suitable sensor that can supply proportional results to the axle rotation is to be used.

In order to measure wheel rotation, a shaft extension in the speedometer cable that has a magnetic sensor inside furnishes pulses proportional to the cable rotation that, by its turn, is also proportional to the wheel period. The central microprocessor controller unit 8 computes it by multiplying these pulses by a constant value (the vehicle power transmission constant).

The present invention has only one actuator that is a fuel blocking device attached to the fuel distributing device (carburetor, electronic fuel injection, diesel fuel injection, etc.). When actuated, the fuel supply is interrupted. This actuator has a motor rotation-per-minute limit action without load in order to reduce its value to a point below the corresponding value of a given gas pedal pressure point when the motor is suddenly load free. This situation normally occurs while in a gearshift operation: the gas pedal has its pressure sustained by the driver while the central microprocessor controller unit disengages the clutch. Without load, the motor RPM will start to climb, but the central microprocessor controller unit controls it by switching the actuator to adjust it to the rotation of the next gear. When the gearshift is completed, the actuator is set out to allow the motor to develop torque.

The start-rolling process in order to have a soft one without bumping and oscillations is a servo mechanism that tries to keep constant the motor rotation-per-minute (RPM) at the chosen threshold value shown in FIG. 7. The central microprocessor controller unit 8 measures RPM continuously and, when the threshold value is reached (1500 RPM in the example), it starts to engage the clutch; the more the RPM increases, the more engages. The vehicle load applied to the motor has a brake effect on it and forces the RPM value to be reduced, while sustaining it a little bit above the threshold value (1500 RPM).

Meanwhile, suppose the driver maintains the gas pedal at the same pressure, a skid effect on the clutch sustains the overall system equilibrium with a constant torque and constant motor rotation-per-minute under the clutch servo mechanism supervisory action. But as torque is being applied to the wheels, the vehicle accelerates and more and more speed is achieved until the gearbox axle speed equals motor axle speed. At this very point, the motor axle speed starts to climb freely as there is no more clutch skid or need for clutch control by the central microprocessor controller unit and the vehicle starts to roll fully clutch engaged.

One can note that the torque applied to the wheels depends solely on the gas pedal pressure. If the driver wishes a fast departure, all he has to do is to apply more pressure with his foot to the gas pedal: the central microprocessor controller unit will engage the clutch more deeply in order to try to keep the motor RPM within the selected threshold value tolerances; therefore more torque will be applied to the wheels and a greater acceleration will take place.

The overall clutch servo mechanism gain is purposely set low to insure system stability and also another effect is achieved: for bigger torque, the stabilized rotation is also higher, which led to a better motor horsepower handling in fast departures.

The comparator block which establishes the comparison between the motor rotation and the rotation threshold is an electronic summing circuit 10 and is included in the central microprocessor controller unit 8, while the other comparator block is purely mechanical (a summing torque device). Actually, it is a summing circuit of the positive motor torque imposed by the accelerator and the negative torque (vehicle load) applied by the clutch engaging action resulting in a positive angular acceleration when the former is higher than the latter and vice-versa. Furthermore, as the feedback parameter is speed, one can consider the motor block as a mathematical integrator.

During departure condition and while clutch skid occurs, the valid model is a classic second order servo mechanism that obeys the following equations:

$$Torque = A \ (1500 \ RPM - \omega)$$

and $$\omega = k \int_{\emptyset}^{t} (motor \bullet torque - clutch \bullet torque) \delta t$$

This servo mechanism equilibrium keeps the w speed constant for each motor torque level (gas pedal position):

$$Torque \ C(Clutch) = Torque \ M(Motor) = B \times gas \ pedal$$

There are other parameters which might affect this type of servo mechanism stability like clutch delays and associated non-linearities, but with open-loop low gain set-up, this problem does not occur.

The final result aside, a soft vehicle departure driver controlled, the overall system is self-adjusted without transmission behavior changing due to mechanical components lasting or road pavement conditions.

To define gearshift decision, the torque ×motor rotation, the torque ×fuel consumption curves and the transmission reduction factors (motor axle rotation speed ×wheels rotation speed) for each gear as well are included in the central microprocessor controller unit 8 operational software table, which, depending on the vehicle characteristics establishes the right gearshift instant. The gearshift move from a lower gear (more torque) to a higher gear (less torque) is determined solely by the motor rotation-per-minute level; it is independent from the gear in use, but directly dependent from the gas pedal position (vehicle speed and acceleration).

The central microprocessor controller unit 8 reads the higher pressure on the gas pedal position as a driver intention to increase speed faster, thereby holding the gear in use to achieve higher motor rotations till a gearshift is mandatory.

The gearshift move from a higher gear (less torque) to a lower gear (higher torque) is solely determined by the vehicle speed: when the vehicle loses speed, e.g. 30% below the point, the present gear was selected (see last paragraph), the central microprocessor controller unit 8 makes the gearshift to a higher torque gear.

One can note that the gearshift decision may be accelerated by the gas pedal position if the foot pressure on it increases as compared to the cruise pressure evaluated on it. Smooth gearshifts without sudden vehicle accelerations or large RPM changes are achieved with the following gearshift synchronization: the motor RPM is adjusted to a value very close to that of a disengaged clutch for the present gear. The clutch is then deactivated (disengaged) and the gearshift lever is moved to its corresponding neutral position.

While the clutch is not disengaged from the gearbox, nothing happens. When the motor RPM starts to climb due to clutch disengaging (the gas pedal pressure is maintained constant by the driver) the central microprocessor controller unit 8 activates the actuator device that controls fuel flow and sustains the previous motor RPM with the clutch engaged (the motor moment of inertia is taken into account). When the gearshift lever reaches the new neutral position, the motor RPM is then set to a new motor RPM compatible with the next gear and vehicle speed and, when reached, the gearshift lever is advanced to engage it.

When the new gear is engaged, the clutch starts to be smoothly engaged with the gearbox. When the clutch engaging is finished, the motor RPM has already reached its correct value. The central microprocessor controller unit 8 deactivates the actuator device and the gearshift procedure is final.

The gearshift driver control is accomplished according to the acceleration range and the gearshift speed depends upon the gas pedal position. The driver has some control regarding the gearshift instant: if the vehicle moves at a speed close to a gearshift action to a lesser torque gear and the gas pedal has a momentary reduction on its foot pressure, then the lower torque range is enabled for this new speed and the gearshift is performed. Similarly, if the gas pedal is further pressed close to a condition of gearshift to a higher torque gear, then the gearshift is also anticipated (an operation known as kick-down) and performed. This type of gearshift control when performed by a skilled driver can optimize the vehicle performance and further reduce fuel consumption, as the central microprocessor controller unit cannot sense road conditions and traffic, traffic lights, coming uphill, etc.

The central microprocessor controller unit 8 operational software, based on the related descriptions and techniques, using specially developed algorithms can be ported to any microprocessor which is state-of-the-art, at any time and indicates its adaptability. It was duly registered in Brazil at the Instituto nacional de Propriedade Industrial under n°93006208 in Jul. 12, 1993 and is protected worldwide by international treaties and agreements.

While the preferred embodiment of the invention has been described in detail, modifications and adaptations may be made thereto, without departing from the spirit and scope of the invention as delineated in the following claims:

I claim:

1. A computer controlled gearshift system with automatic clutch actuator for vehicles with manual gearboxes, including servo mechanisms, electric sensors, magnetic sensors, resistive potentiometric sensors, electric actuators, connected to and controlled by a central microprocessor controller unit, that performs instructions to automate gearshifts and clutch actuation in a manual gearbox equipped vehicle, in such a way to enable it to behave like an automatic transmission vehicle, said system comprising steps of:

continuously adjusting clutch movement by a twin servo mechanism clutch movement action setup at any point of its travel range by furnishing, through a digital-to-analog converter output an engaging or a disengaging signal that is fed to a non-inverting input of an electronic summing circuit that is further fed in it's two other inverting inputs with feedback signals coming from the clutch closed-loop servo motor axle rotation, wherein one of said two other inputs is proportional to its angular speed of rotation, and the other one is proportional to it's angular position;

routing the electronic summing circuit result to a power amplifier that drives the direct current motor in one of the two possible senses of rotation that occurs in each movement of engaging or disengaging, wherein while a M torque by gas pedal position of said vehicle and its movements that reflects driver intentions that further control B block—Motor, said M torque being supplied to the non-inverting input of a mechanical summing device, wherein, when unloaded, represents the delayed inertia moment vehicle motor axle RPM and, at the vehicle departure from stop when a threshold RPM level is reached by the vehicle motor B block and detected at the electronic summing device;

controlling the clutch servo mechanism actuator (A) with said electronic summing device to engage the clutch that, by its turn, supplies a C torque represented by the instantaneous vehicle inertia moment as an inverted input of the mechanical summing device, thereby opposing it to the motor furnished M torque which reduces it as it is affected by the vehicles weight plus load inertia moment, allowing a new motor axle angular speed to be established;

measuring again by the motor RPM sensor to obtain a new angular value w that when compared to threshold RPM reference level at the electronic summing circuit;

supplying a signal (positive or negative) by said electronic summing circuit to the clutch servo mechanism, whereby its axle is moved clockwise or counterclockwise in order to maintain the C torque opposed to the M torque in such a way that the measured B block vehicle motor RPM remains close to the RPM reference level until this level is definitely surpassed by the vehicle motor RPM when the engaging action is definitely completed; and providing, with a minimum of two gearshift, fixed steps servo mechanism employing positioning feedback.

2. The Computer controlled gearshift system of claim 1, wherein the twin servo mechanism clutch movement action obeys the equation:

$$\text{Torque}=A(1500\ \text{RPM}-w)$$

wherein the 1500 RPM figure represents not restrictively the threshold RPM level where the clutch behavior starts to perform at the vehicle departure from stop condition, while a clutch skid occurs, the following equations also applies:

$$\text{Torque }C(\text{Clutch})=\text{Torque }M(\text{Motor})=B\times gas\ pedal$$

wherein said equation represents the equation of the dual servomotor behavior at the threshold RPM value, wherein the clutch torque (C) is equal to the torque (M) and also equal to the block motor (B) as a function of the gas pedal position and its instantaneous pressure and, wherein the following equation shows the RPM (w) relationship $$w = k \int_{\phi}^{t} (\text{motor} \bullet \text{torque} - \text{clutch} \bullet \text{torque}) \delta t$$

wherein w behaves as a function of torques and moments of inertia moments involved and indirectly also as a function of the gas pedal position and its instantaneous pressure related as a function of time.

3. The computer controlled gearshift system of claim 2, further providing the steps of:
   comparing the motor B block axle angular speed (RPM) with the RPM reference threshold level by the first of two summing devices resulting in a signal proportional to their difference; and
   processing by a second summing device the positive torque imposed by the vehicle motor derived from the gas pedal pressure and the negative C torque derived from the present vehicle load inertia moment applied by the clutch engaging action while transferring torque to the wheels, resulting in a positive angular speed when the positive torque imposed by the motor is bigger than the negative torque imposed by the clutch engaging action and vice-versa, thereby resulting in a new motor B block axle angular speed (RPM), wherein feedback value and inertia moment motor block behaves as a mathematical integrator, wherein the clutch dual servomotor gain at the vehicle departure moment is set purposely low to assure full system stability and also the motor B block axle rotation angular speed is proportional to the applied torque.

4. The computer controlled gearshift system of claim 2, further providing the steps of:
   supplying a direct current voltage by a variable resistor attached to the clutch engaging servo motor axle proportional to its cursor angle to one of the analog-to-digital converter inputs of the central microprocessor controller unit, wherein it identifies the axle instantaneous angular position;
   comparing the axle angular position with the RPM threshold level;
   driving the servo motor for a defined sense of rotation— clockwise or counterclockwise—and its speed and further reducing it when approaching the speed target value;
   shutting off a servo motor drive current when said speed target value is reached;
   applying an axle rotational speed proportional signal to the clutch engaging servo mechanism circuit for stability; and
   performing the central microprocessor controller unit driving action done through a digital-to-analog converter power amplified and pulse width modulated to drive the clutch engaging servo mechanism.

5. The computer controlled gearshift system of claim 1, further providing the steps of:
   comparing the motor B block axle angular speed (RPM) with the RPM reference threshold level by the first of two summing devices resulting in a signal proportional to their difference; and
   processing by a second summing device the positive torque imposed by the vehicle motor derived from the gas pedal pressure and the negative C torque derived from the present vehicle load inertia moment applied by the clutch engaging action while transferring torque to the wheels, resulting in a positive angular speed when the positive torque imposed by the motor is bigger than the negative torque imposed by the clutch engaging action and vice-versa, thereby resulting in a new motor B block axle angular speed (RPM), wherein feedback value and inertia moment motor block behaves as a mathematical integrator, wherein the clutch dual servomotor gain at the vehicle departure moment is set purposely low to assure full system stability and also the motor B block axle rotation angular speed is proportional to the applied torque.

6. The computer controlled gearshift system of claim 1, further providing the steps of:
   supplying a different binary signal by each of the four zones of binary coded disc sensor zones to the central microprocessor controller unit, allowing it to identify in which zone the gearshift servo motor axle is at any given moment and thus enabling it to decide about driving polarity current to be applied to the gearshifts direct current servomotors to reach a new stabilization point of the motor axle in one of 3 possible boundaries angular positions;
   performing stabilization if the direct current servo motor (1) axle is positioned close to a boundary between any two zones;
   applying full power by the central microprocessor control unit through the power amplifier with the corresponding rotation current polarity up to the moment the disc sensor binary code detects target boundary crossing when current polarity is then reversed and amplitude reduced, forcing a sudden motor stop with a reversal of rotation unit the same target boundary is crossed again when the motor driving current is shut-off;
   actuating the first servo motor to shift the gearshift lever from the previously engaged gear position to its neutral position;
   actuating the second servo motor to move the gearshift lever from the second gear neutral position to the neutral position next to the gear, to be engaged, wherein the first servo motor is actuated to move the gearshift lever to the new engaging gear position.

7. The computer controlled gearshift system of claim 1, further providing the steps of:
   supplying a direct current voltage by a variable resistor attached to the clutch engaging servo motor axle proportional to its cursor angle to one of the analog-to-digital converter inputs of the central microprocessor controller unit, wherein it identifies the axle instantaneous angular position;
   comparing the axle angular position derived torque with the expected torque level;
   driving the servo motor for a defined sense of rotation— clockwise or counterclockwise—and it's speed and further reducing it when approaching the torque target value;
   shutting off a servo motor drive current when said torque target value is reached;

applying a clutch servomotor axle rotational speed axle rotational speed proportional signal to the clutch engaging servo mechanism circuit for stability; and performing the central microprocessor controller unit driving action done through a digital-to-analog converter power amplified and pulse width modulated to drive the clutch engaging servo mechanism.

8. The computer controlled gearshift of claim 1, further comprising:

three sensors, including a position sensor attached to the gas pedal movement and two speed sensors, one that monitors the axle motor rotation to measure RPM and the second to measure vehicle speed, wherein the first sensor is a variable resistor that supplies a direct current voltage proportional to its cursor angle to one of the analog-to-digital converter inputs of the central microprocessor controller unit, allowing it to identify the gas pedal instantaneous position which reflects the driver intention to keep the present vehicle speed, to accelerate it or to reduce the speed, thereby allowing a kick down gas pedal action that enables fast gearshift gear reduction to a more powerful torque transfer one, or a gas pedal pressure reduction thereby allowing a fast gearshift to a gear with less torque well before the corresponding gearshift timing arrives; and wherein the speed sensors measure the rotation period of the motor axle and the wheels speed, wherein each angular speed is computed by the central microprocessor controller unit by computing its inverse: Speed=1/period, as each speed sensor supplies several pulses per rotation thus enabling, through individual multiplying, constant factors that each angular speed be correctly measured.

9. The computer controlled gearshift system of claim 1, further providing the steps of:

performing control directly through a single actuator to perform in any fuel injection device as a gas pedal substitute parallel action;

controlling fuel flow to limit the RPM level in a gearshift operation due to the decision to do it, wherein as the driver keeps the foot pressure on the gas pedal the operation is decided by the central microprocessor controller unit, wherein the unloaded motor RPM tends to increase when the clutch is disengaged;

adjusting the unloaded motor RPM through the actuator operation until close to the next gear RPM level in the central microprocessor control unit when a gearshift is completed and the clutch is engaged and freeing the fuel flow by the actuator to enable the vehicle motor to re-apply torque to the wheels.

10. The computer controlled gearshift system of claim 1, further providing the steps of:

performing gearshift smoothly, without sudden accelerations or large motor RPM fluctuations through a synchronizing gearshift process;

first setting the motor RPM by the central microprocessor controller unit to a level close to a no torque for that vehicle speed and gear;

disengaging the clutch and the gear lever starts to be moved to the neutral position;

controlling the motor RPM as the clutch is disengaged;

adjusting the unloaded motor RPM through actuator operations close to the corresponding value of the next gear RPM level for that vehicle instantaneous speed by the central microprocessor controller unit; and engaging by the clutch when the gearshift operation is completed, and the actuator stops controlling the motor RPM, thereby transferring torque to the wheels.

11. The computer controlled gearshift system of claim 1, wherein the central microprocessor controller unit operates under a custom developed software control with algorithms also including the motor torque curves and the transmission motor-wheels ratio for each gear of a given vehicle, wherein the right timing and moment of a given gearshift is obtained.

* * * * *